United States Patent
Hori et al.

(10) Patent No.: US 11,879,596 B2
(45) Date of Patent: Jan. 23, 2024

(54) PRESSURE TESTING METHOD AND PRESSURE TESTER

(71) Applicant: TOYOTA JIDOSHA KABUSHIKI KAISHA, Toyota (JP)

(72) Inventors: Yoshihiro Hori, Nisshin (JP); Takayoshi Doi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 442 days.

(21) Appl. No.: 17/217,130

(22) Filed: Mar. 30, 2021

(65) Prior Publication Data
US 2021/0301980 A1   Sep. 30, 2021

(30) Foreign Application Priority Data
Mar. 31, 2020   (JP) .................................. 2020-063377

(51) Int. Cl.
*F17C 13/02*   (2006.01)
*G01N 3/12*   (2006.01)
*G01N 3/06*   (2006.01)

(52) U.S. Cl.
CPC ............. *F17C 13/025* (2013.01); *G01N 3/06* (2013.01); *G01N 3/12* (2013.01);
(Continued)

(58) Field of Classification Search
CPC ................................ F17C 13/025; G01N 3/12
See application file for complete search history.

(56) References Cited

U.S. PATENT DOCUMENTS 5,522,428 A * 6/1996 Duvall .................. F17C 13/123
141/94
5,554,810 A * 9/1996 Anifrani ................ G01N 29/14
73/587
(Continued)

FOREIGN PATENT DOCUMENTS

JP   2003066015 A   3/2003
JP   2010014624 A   1/2010
(Continued)

OTHER PUBLICATIONS

Non-Final Office Action, United States Patent and Trademark Office issued to U.S. Appl. No. 17/217,478 dated Mar. 27, 2023.

*Primary Examiner* — Ryan D Walsh
(74) *Attorney, Agent, or Firm* — Hunton Andrews Kurth LLP

(57) ABSTRACT

Provided is a pressure testing method for a high-pressure tank capable of avoiding a destruction of the high-pressure tank during a pressure test. A pressure testing method includes: extracting a plurality of AE waveforms from output waveforms of an AE sensor while increasing a pressure inside the high-pressure tank; and testing the high-pressure tank based on the extracted plurality of AE waveforms. The method includes: while increasing the pressure inside the high-pressure tank, classifying the extracted AE waveforms into first waveforms and second waveforms with a classifier that is machine-learned so as to classify the plurality of AE waveforms into the first waveforms derived from a macrocrack that increases immediately before destruction of the high-pressure tank, and the second waveforms derived from a microcrack smaller than the macrocrack; and stopping pressurization of the high-pressure tank based on the number of the first waveforms.

14 Claims, 10 Drawing Sheets

(52) U.S. Cl.
CPC ............... *F17C 2201/0109* (2013.01); *F17C 2203/0604* (2013.01); *F17C 2203/0619* (2013.01); *F17C 2203/0673* (2013.01); *F17C 2221/012* (2013.01); *F17C 2223/035* (2013.01); *G01N 2203/0266* (2013.01); *G01N 2203/0658* (2013.01)

(56) References Cited

U.S. PATENT DOCUMENTS

| | | | |
|---|---|---|---|
| 8,316,712 B2 * | 11/2012 | Muravin | ............... G01N 29/14 73/602 |
| 2008/0302186 A1 | 12/2008 | Bohse et al. | |
| 2010/0001851 A1 | 1/2010 | Handa | |
| 2010/0107765 A1 | 5/2010 | Murakami et al. | |
| 2017/0104227 A1 | 4/2017 | Otsubo | |
| 2021/0301981 A1 | 9/2021 | Hori et al. | |

FOREIGN PATENT DOCUMENTS

| | | |
|---|---|---|
| JP | 2011102700 A | 5/2011 |
| JP | 2015031630 A | 2/2015 |
| JP | 2017072244 A | 4/2017 |
| WO | 2009008515 A1 | 1/2009 |
| WO | 2014057987 A1 | 4/2014 |

* cited by examiner

| | Images (scalograms) | Classification |
|---|---|---|
| 1 |  | Second image (Microcrack) |
| 2 |  | Second image (Microcrack) |
| 3 |  | First image (Macrocracks) |
| 4 |  | First image (Macrocracks) |
| . | . | . |
| . | . | . |
| . | . | . |

PRESSURE TESTING METHOD AND PRESSURE TESTER

CROSS REFERENCE TO RELATED APPLICATIONS

The present application claims priority from Japanese patent application JP 2020-063377 filed on Mar. 31, 2020, the entire content of which is hereby incorporated by reference into this application.

BACKGROUND

Technical Field

The present disclosure relates to a pressure testing method and a pressure tester for a high-pressure tank including a liner and a fiber-reinforced resin layer covering the outer surface of the liner.

Background Art

Conventionally known testing methods for a liquid-containing tank include a method based on an AE (acoustic emission) technique (see JP 2003-66015 A, for example). JP 2003-66015 A describes a testing method of a tank. The method detects sound generated in the tank storing liquid, and removes noise from the original waveform of the detected sound to measure the sound in the tank with a high SN ratio. This testing method enables detection of a corrosion on the inner surface of the tank.

SUMMARY

A high-pressure tank including a liner and a fiber-reinforced resin layer covering the outer surface of the liner undergoes a pressure test as an inspection after the manufacturing (before shipping). The pressure test pressurizes the inside of the high-pressure tank to a predetermined pressure to inspect for abnormalities. In such a pressure test, a defective high-pressure tank, if any, may break (burst) during the pressurization. A high-pressure tank is pressurized to about tens to hundreds of MPa during the pressure test, and the internal energy is extremely high. If such a high-pressure tank breaks, the tester and the peripherals may be damaged by the impact.

To prevent the breakage of a high-pressure tank by pressurization, a destruction sign of the high-pressure tank may be detected during the pressure test of the high-pressure tank. A pressure test for a high-pressure tank based on the technique described in JP 2003-66015 A, however, does not detect such a destruction sign of the high-pressure tank.

In view of these points, the present disclosure provides a pressure testing method and a pressure tester for a high-pressure tank capable of avoiding a destruction of the high-pressure tank during a pressure test.

A pressure testing method according to the present disclosure tests a high-pressure tank including a liner having an outer surface and a fiber-reinforced resin layer covering the outer surface of the liner. The method includes: extracting a plurality of AE waveforms from an output waveform of an AE sensor, the AE sensor being configured to detect AE waves generated in the high-pressure tank while increasing a pressure inside the high-pressure tank; and testing the high-pressure tank based on the extracted plurality of AE waveforms. The method includes: while increasing the pressure inside the high-pressure tank, classifying the extracted plurality of AE waveforms into first waveforms and second waveforms with a classifier that is machine-learned so as to classify the plurality of AE waveforms into the first waveforms derived from a macrocrack that increases immediately before destruction of the high-pressure tank, and the second waveforms derived from a microcrack smaller than the macrocrack; counting the number of the first waveforms classified; and stopping pressurization of the high-pressure tank based on the number of the first waveforms counted.

In the present specification and claims, AE is an abbreviation for acoustic emission, and refers to a phenomenon in which energy is released as elastic waves when a material or a structure is broken or deformed. AE waves are elastic waves released when a material or a structure is broken or deformed. An AE sensor is a sensor that detects elastic waves (AE waves) generated with AE.

The pressure testing method of the present disclosure extracts a plurality of AE waveforms from an output waveform of an AE sensor while increasing a pressure inside the high-pressure tank, classifies the plurality of extracted AE waveforms into first waveforms and second waveforms, and stops pressurization of the high-pressure tank based on the number of the first waveforms classified. This enables a determination whether or not the high-pressure tank is in the state immediately before the destruction based on the number of the first images and stopping the pressurization of the high-pressure tank. The method therefore stops pressurization of the high-pressure tank before the destruction, and so avoids the destruction.

In some embodiments, the pressure testing method stops pressurization of the high-pressure tank in response to the cumulative number of the first waveforms reaching equal to or greater than a first threshold. Macrocracks increase immediately before the destruction of the high-pressure tank during the pressurization, and the cumulative number of the first waveforms derived from the macrocracks accordingly increases. When the cumulative number of the first waveforms exceeds a certain value (first threshold), the high-pressure tank is more likely to break. The method determines whether or not the high-pressure tank is in the state immediately before the destruction based on the cumulative number of the first waveforms and so avoids the destruction of the high-pressure tank reliably.

In some embodiments, the pressure testing method stops pressurization of the high-pressure tank in response to an increasing rate of the first waveforms to an increase amount of pressure in the high-pressure tank being equal to or greater than a second threshold. Macrocracks sharply increase immediately before the destruction of the high-pressure tank during the pressurization. Specifically, when the pressure inside the high-pressure tank increases at a constant rate, the number of macrocracks generated per unit time increases sharply. In other words, the rate of increase of macrocracks to the amount of pressure increase in the high-pressure tank increases sharply. The method determines whether or not the high-pressure tank is in the state immediately before the destruction based on the increase rate of the first waveforms relative to the increase amount of pressure, and so avoids the destruction of the high-pressure tank reliably.

In some embodiments, the pressure testing method stops pressurization of the high-pressure tank in response to a ratio of the first waveforms to a sum of the first waveforms and the second waveforms increasing equal to or greater than a third threshold. During pressurization of a high-pressure tank, the ratio of the number of macrocracks generated to the number of microcracks and macrocracks generated increases immediately before the destruction of the high-pressure tank. The method determines whether or not the high-pressure tank is in the state immediately before the destruction based on the ratio of the first waveforms to a sum of the first waveforms and the second waveforms, and so avoids the destruction of the high-pressure tank reliably.

In some embodiments of the pressure testing method, the high-pressure tank is filled with liquid for pressurizing the inside of the high-pressure tank. In this way, when the high-pressure tank is pressurized with the liquid, the AE waves generated in the fiber-reinforced resin layer propagate not only through the fiber-reinforced resin layer but also through the liquid to be detected by the AE sensor. While the AE waves propagate through liquid, they are reflected at the interface between the liquid and the liner, and the waves propagating through the fiber-reinforced resin layer are superimposed on the waves propagating through the liquid. Therefore, it is typically difficult to accurately classify a plurality of AE waveforms extracted from the output waveforms of the AE sensor into first waveforms and second waveforms. The pressure testing method as described above enables accurate classification of a plurality of AE waveforms into first waveforms and second waveforms with a machine-learned classifier.

In some embodiments of the pressure testing method, the high-pressure tank is filled with gas for pressurizing the inside of the high-pressure tank. In this way, when the high-pressure tank is pressurized with gas, AE waves generated in the fiber-reinforced resin layer propagate through the fiber-reinforced resin layer to be detected by the AE sensor. At this time, the AE waves propagate through the fiber-reinforced resin layer without passing through the liquid. Unlike the propagation through liquid, the AE waves are not reflected at the interface between the liquid and the liner and the waves propagating through the fiber-reinforced resin layer are not superimposed on the waves propagating through the liquid. The method therefore enables accurate classification of a plurality of AE waveforms extracted from the output waveforms of the AE sensor into first waveforms and second waveforms.

In some embodiments of the pressure testing method, the method wavelet-transforms the extracted plurality of AE waveforms to create a plurality of images while increasing the pressure inside the high-pressure tank, classifies the plurality of images corresponding to the plurality of AE waves into first images corresponding to the first waveforms and second images corresponding to second waveforms with the classifier that is machine-learned so as to classify the first images and the second images; counts the number of the first images classified; and stops pressurization of the high-pressure tank based on the number of the first images counted. The wavelet transformation of the extracted AE waveforms creates images (scalograms) indicative of temporal changer of the frequency components. The classifier classifies the plurality of created images, and this easily classifies the images into the first images and the second images. The method therefore enables an easy determination whether or not the high-pressure tank is in the state immediately before the destruction.

A pressure tester according to the present disclosure is configured to test a high-pressure tank including a liner having an outer surface and a fiber-reinforced resin layer covering the outer surface of the liner. The pressure tester is configured to extract a plurality of AE waveforms from output waveforms of an AE sensor, the AE sensor being configured to detect AE waves generated in the high-pressure tank while increasing a pressure inside the high-pressure tank; and test the high-pressure tank based on the extracted plurality of AE waveforms. The pressure tester includes a controller configured to control pressurization of an inside of the high-pressure tank. The controller includes: a pressurizing unit configured to execute pressurization of the inside of the high-pressure tank; a classifier that is machine-learned so as to classify the plurality of AE waveforms into first waveforms derived from macrocracks that increase immediately before destruction of the high-pressure tank, and second waveforms derived from microcracks smaller than the macrocracks; a counter configured to, while increasing the pressure inside the high-pressure tank by the pressurizing unit, count the number of the first waveforms classified by the classifier; and a pressurization stopper configured to stop pressurization of the high-pressure tank by the pressurizing unit based on the number of the first waveforms counted by the counter.

In the pressure tester of the present disclosure, the classifier classifies the plurality of AE waveforms into first waveforms derived from macrocracks that increase immediately before destruction of the high-pressure tank, and second waveforms derived from microcracks, and the pressurization stopper stops pressurization of the high-pressure tank by the pressurizing unit based on the number of the first waveforms. This enables a determination whether or not the high-pressure tank is in the state immediately before the destruction based on the number of the first images and stopping the pressurization of the high-pressure tank. The pressure tester therefore stops pressurization of the high-pressure tank before the destruction, and so avoids the destruction.

In some embodiments, the pressurization stopper of the pressure tester stops pressurization of the high-pressure tank in response to the cumulative number of the first waveforms reaching equal to or greater than a first threshold. Macrocracks increase immediately before the destruction of the high-pressure tank during the pressurization, and the cumulative number of the first waveforms derived from the macrocracks accordingly increases. When the cumulative number of the first waveforms exceeds a certain value (first threshold), the high-pressure tank is more likely to break. The pressure tester determines whether or not the high-pressure tank is in the state immediately before the destruction based on the cumulative number of the first waveforms and so avoids the destruction of the high-pressure tank reliably.

In some embodiments of the pressure tester, the pressurization stopper stops pressurization of the high-pressure tank in response to an increasing rate of the first waveforms to an increase amount of pressure in the high-pressure tank being equal to or greater than a second threshold. Macrocracks sharply increase immediately before the destruction of the high-pressure tank during the pressurization. Specifically, when the pressure inside the high-pressure tank increases at a constant rate, the number of macrocracks generated per unit time increases sharply. In other words, the rate of increase of macrocracks to the amount of pressure increase in the high-pressure tank increases sharply. The pressure tester determines whether or not the high-pressure tank is in the state immediately before the destruction based on the increase rate of the first waveforms relative to the increase amount of pressure, and so avoids the destruction of the high-pressure tank reliably.

In some embodiments of the pressure tester, the pressurization stopper stops pressurization of the high-pressure tank in response to a ratio of the first waveforms to a sum of the first waveforms and the second waveforms increasing equal to or greater than a third threshold. During pressurization of a high-pressure tank, the ratio of the number of macrocracks generated to the number of microcracks and macrocracks generated increases immediately before the destruction of the high-pressure tank. The pressure tester determines whether or not the high-pressure tank is in the state immediately before the destruction based on the ratio of the first waveforms to a sum of the first waveforms and the second waveforms, and so avoids the destruction of the high-pressure tank reliably.

In some embodiments of the pressure tester, the pressurizing unit pressurizes the inside of the high-pressure tank with a pump configured to fill the high-pressure tank with liquid. In this way, when the high-pressure tank is pressurized with the liquid, the AE waves generated in the fiber-reinforced resin layer propagate not only in the fiber-reinforced resin layer but also in the liquid to be detected by the AE sensor. While the AE waves propagate through liquid, they are reflected at the interface between the liquid and the liner, and the waves propagating through the fiber-reinforced resin layer are superimposed on the waves propagating through the liquid. Therefore, it is typically difficult to accurately classify a plurality of AE waveforms extracted from the output waveforms of the AE sensor into first waveforms and second waveforms. The pressure tester as described above enables accurate classification of a plurality of AE waveforms into first waveforms and second waveforms with a machine-learned classifier.

In some embodiments of the pressure tester, the pressurizing unit pressurizes the inside of the high-pressure tank with a pump configured to fill the high-pressure tank with gas. In this way, when the high-pressure tank is pressurized with gas, AE waves generated in the fiber-reinforced resin layer propagate through the fiber-reinforced resin layer to be detected by the AE sensor. At this time, the AE waves propagate through the fiber-reinforced resin layer without passing through the liquid. Unlike the propagation through liquid, the AE waves are not reflected at the interface between the liquid and the liner, and the waves propagating through the fiber-reinforced resin layer are not superimposed on the waves propagating through the liquid. The pressure tester therefore enables accurate classification of a plurality of AE waveforms extracted from the output waveforms of the AE sensor into first waveforms and second waveforms.

In some embodiments of the pressure tester, the controller further includes: an extractor configured to extract a plurality of AE waveforms from output waveforms of the AE sensor; and a converter configured to wavelet-transform the plurality of AE waveforms extracted by the extractor to generate a plurality of images. The classifier is machine-learned so as to classify the plurality of images corresponding to the plurality of AE waves into first images corresponding to the first waveforms and second images corresponding to second waveforms. The extractor is configured to extract a plurality of AE waveforms from the output waveforms of the AE sensor while increasing the pressure inside the high-pressure tank. The converter is configured to wavelet-transform the plurality of AE waveforms extracted by the extractor to create a plurality of images. The classifier is configured to classify the plurality of images converted by the converter into the first images and the second images. The counter is configured to count the number of the first images classified by classifier. The pressurization stopper is configured to stop pressurization of the high-pressure tank based on the number of the first images counted by the counter. The wavelet transformation of the extracted AE waveforms creates images (scalograms) indicative of temporal changer of the frequency components. The classifier classifies the plurality of created images, and this easily classifies the images into the first images and the second images. The pressure tester therefore enables an easy determination whether or not the high-pressure tank is in the state immediately before the destruction.

The present disclosure provides a pressure testing method and a pressure tester for a high-pressure tank capable of avoiding a destruction of the high-pressure tank during a pressure test.

DETAILED DESCRIPTION

First Embodiment

Figure 1:
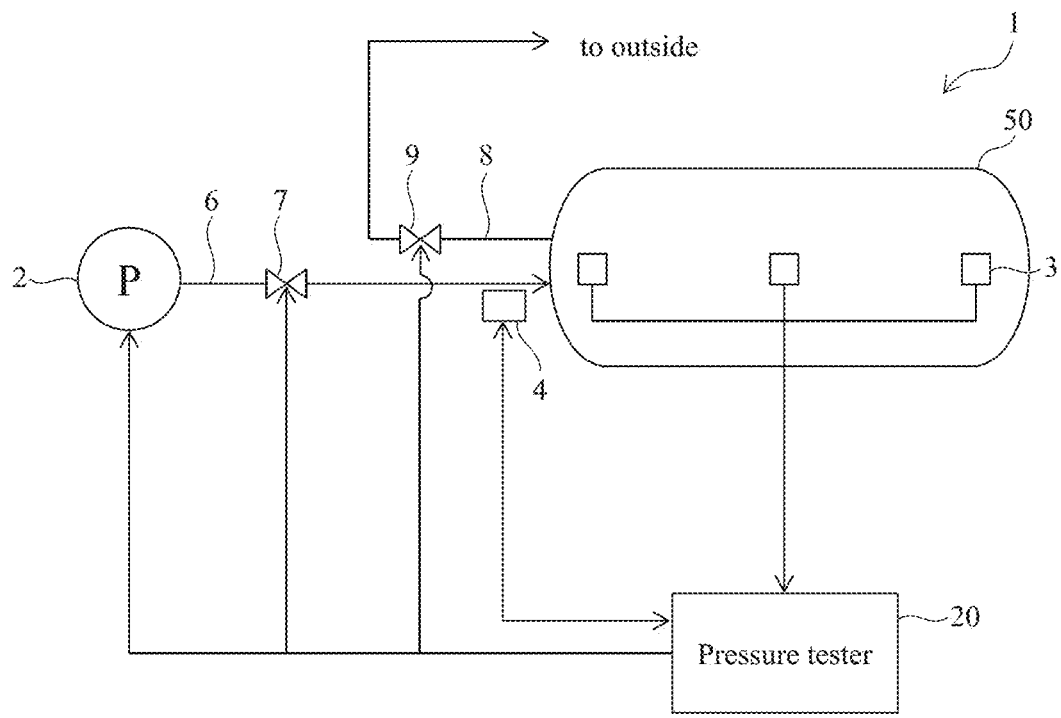
FIG. 1 is a schematic view showing the overall configuration of a test system including a pressure tester according to the first embodiment of the present disclosure.

Referring to the drawings, the following describes a test system 1 including a pressure tester 20 according to a first embodiment of the present disclosure. FIG. 1 is a schematic view showing the overall configuration of the test system 1 including the pressure tester 20 according to the first embodiment of the present disclosure.

As shown in FIG. 1, the test system 1 inspects a high-pressure tank 50. The test system 1 includes: a pump 2 that pressurizes the inside of the high-pressure tank 50; one or more AE sensors 3 mounted on the outer surface of the high-pressure tank 50; a pressure sensor 4 that detects the internal pressure of the high-pressure tank 50; and a pressure tester 20 that controls the drive of the pump 2 and determines the quality of the high-pressure tank 50. This test system 1 is placed in a testing room formed with a thick concrete wall, for example. "AE" means "acoustic emission" in this specification.

The pump 2 is to fill the inside of the high-pressure tank 50 with fluid (liquid or gas) to pressurize the inside of the high-pressure tank 50. In this embodiment, the pump 2 feeds water to the inside of the high-pressure tank 50. The pump 2 draws water from a water tank (not shown) and feeds the water to the high-pressure tank 50. The liquid fed to the high-pressure tank 50 is not limited to water, and a liquid other than water may be used.

The pump 2 connects to a feed pipe 6 made of metal, for example, through which water fed to the high-pressure tank 50 passes. The feed pipe 6 comes with a valve 7 capable of opening and closing the flow channel. The high-pressure tank 50 connects to an exhaust pipe 8 made of metal, for example. The exhaust pipe 8 exhausts the water inside the high-pressure tank 50 to the outside of the testing room. The exhaust pipe 8 comes with a valve 9 capable of opening and closing the flow channel.

The AE sensor(s) 3 detects AE waves generated due to the occurrence of a crack in a fiber-reinforced resin layer 52 described later of the high-pressure tank 50, and outputs the detection result as an output waveform to the pressure tester 20. The AE sensor(s) 3 is not particularly limited as long as it can detect the AE waves generated in the high-pressure tank 50, and may be a piezoelectric sensor, for example.

The AE sensor(s) 3 is fixed at a predetermined position on the outer surface of the fiber-reinforced resin layer 52. The number and fixing positions of the AE sensor(s) 3 are not particularly limited, and in this example, they are fixed at three positions in total, including both ends and the center of the high-pressure tank 50 in the axial direction (longitudinal direction). This configuration of the AE sensors 3 enables the detection of AE waves, no matter where the AE waves are generated in the high-pressure tank 50. Even if two or more AE sensors 3 detect a single AE wave, a known technique can determine that the detected waves are identical based on the waveforms. This means that the number of AEs generated is not counted duplicately.

In the present embodiment, the high-pressure tank 50 is filled with liquid (water in this example), and so the AE waves (vibration) generated in response to AE in the high-pressure tank 50 propagate through both the fiber-reinforced resin layer 52 and water to be detected by the AE sensors 3. While the AE waves propagate through liquid, they are reflected at the interface between the liquid and the liner 51, and the waves propagating through the fiber-reinforced resin layer 52 are superimposed on the waves propagating through the liquid. Therefore, it is typically difficult to accurately classify a plurality of AE waveforms extracted from the output waveforms of the AE sensors 3 into first waveforms and second waveforms, which will be described later. The present embodiment includes a machine-learned classifier 123 as described later, and therefore enables accurate classification of a plurality of AE waveforms into first waveforms and second waveforms.

The pressure sensor 4 is configured to be capable of detecting the internal pressure of the high-pressure tank 50. The pressure sensor 4 may be placed inside the high-pressure tank 50, or may be placed at the feed pipe 6 connecting the pump 2 and the high-pressure tank 50. The pressure sensor 4 outputs the detection result to the pressure tester 20.

Figure 2:
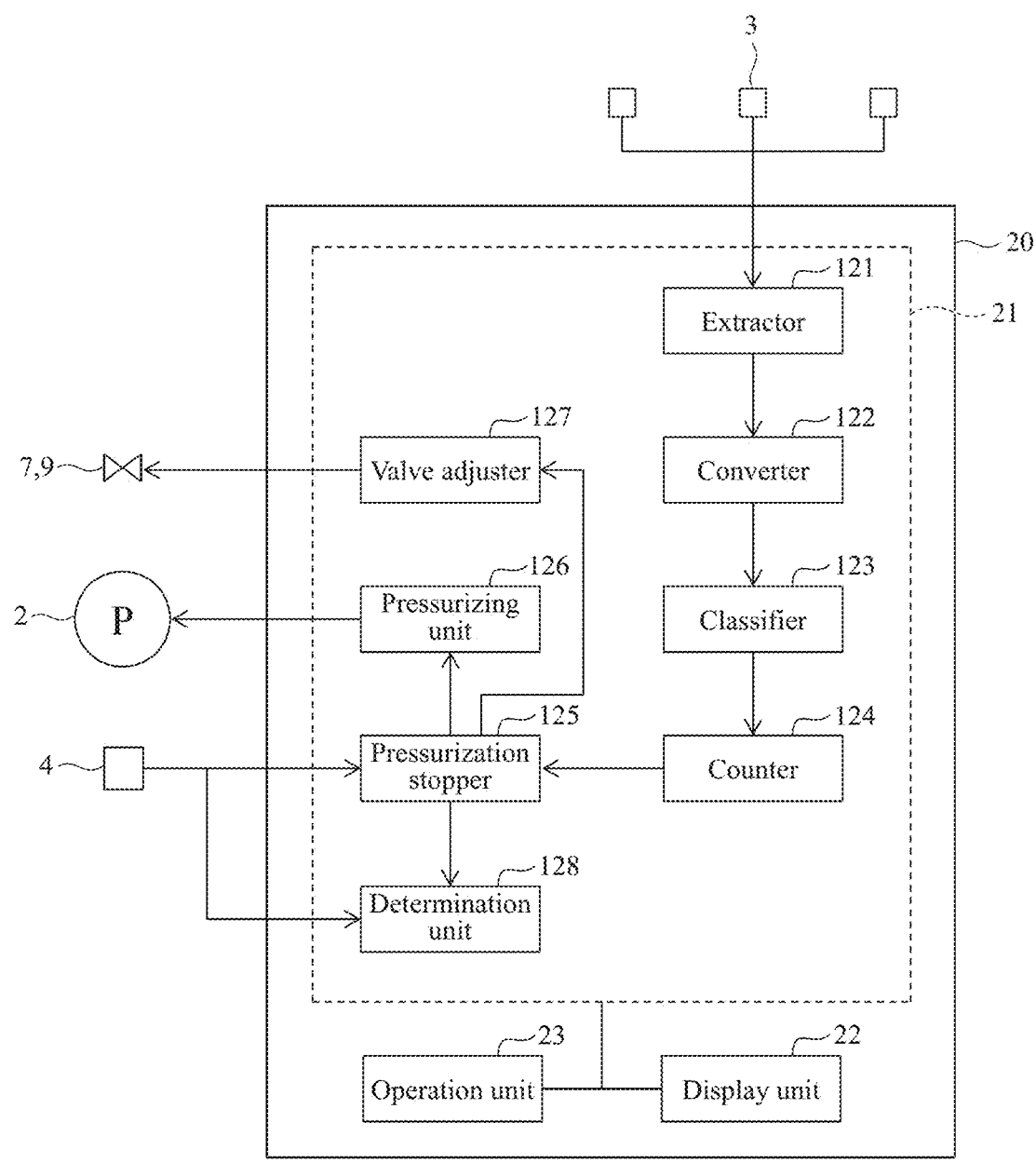
FIG. 2 is a block diagram showing the configuration of a controller of the pressure tester according to the first embodiment of the present disclosure.

The pressure tester 20 is configured to test the high-pressure tank 50 about whether or not an abnormality occurs when the inside of the high-pressure tank 50 increases to a predetermined pressure. As shown in FIG. 2, the pressure tester 20 includes: a controller 21 that controls the pump 2 and the like, a display unit 22 including a display panel; and an operating unit 23 including buttons operated by an operator. In one example, the display unit 22 is configured to display information, such as the internal pressure of the high-pressure tank 50, the pressurizing time, the output waveforms of the AE sensors 3, the operating status of the pump 2, the operating status of the valves 7 and 9, and the outputs from an extractor 121, a converter 122, a classifier 123, a counter 124 and a determination unit 128, which are described later.

The pressure tester 20 is capable of controlling the drive and the stop of the pump 2, and in particular, is capable of stopping the pump 2 based on the output of the AE sensors 3. The pressure tester 20 also controls the opening/closing operation of the valves 7 and 9. The detailed structure of the pressure tester 20 will be described later.

Figure 3:
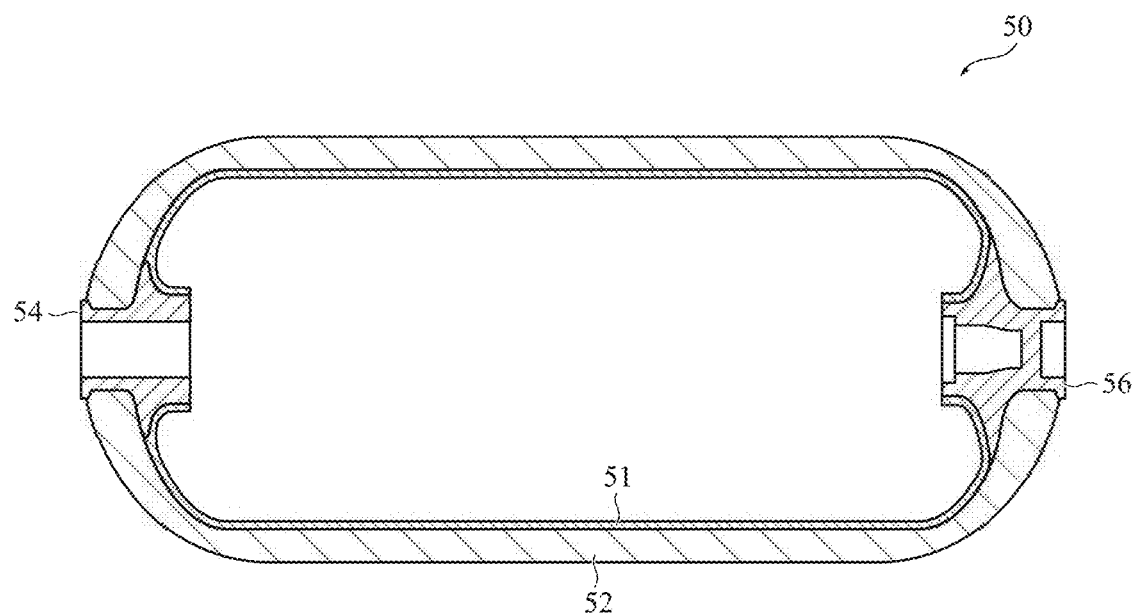
FIG. 3 is a cross-sectional view showing the structure of the high-pressure tank of FIG. 1.

In one example, as shown in FIG. 3, the high-pressure tank 50 is mounted in a fuel cell vehicle, and is filled with high-pressure hydrogen gas. The gas with which the high-pressure tank 50 is filled is not limited to hydrogen gas. The high-pressure tank 50 is a substantially cylindrical high-pressure gas storage vessel with both ends rounded like a dome shape. The high-pressure tank 50 includes a liner 51 having a gas barrier property, and the fiber-reinforced resin layer 52 made of a fiber-reinforced resin covering the outer surface of the liner 51.

The liner 51 is made of resin or metal, and defines a storage space filled with high-pressure hydrogen gas. The liner 51 has openings at both ends in the longitudinal direction (axial direction), and the openings come with a cap 54 and an end boss 56. The cap 54 and the end boss 56 are prepared by machining a metal material, such as aluminum or an aluminum alloy, into a predetermined shape. The cap 54 connects to the feed pipe 6 and the exhaust pipe 8 to feed and exhaust hydrogen gas to/from the storage space.

The fiber-reinforced resin layer 52 covers the outer surface of the liner 51 and has a function of reinforcing the liner 51 to enhance the mechanical strength such as rigidity and pressure resistance of the high-pressure tank 50. The fiber-reinforced resin layer 52 includes thermosetting resin and reinforcement fibers. In some embodiments, examples of the thermosetting resin include phenol resins, melamine resins, urea resins, and epoxy resins. In some embodiments, the thermosetting resin is an epoxy resin from the viewpoint of mechanical strength, for example. Examples of the reinforcement fibers include glass fibers, aramid fibers, boron fibers, and carbon fibers. In some embodiments, the reinforcement fibers are carbon fibers from the viewpoints of light weight and mechanical strength, for example.

Next, the detailed structure of the pressure tester 20 is described below.

As shown in FIG. 2, the controller 21 of the pressure tester 20 includes a CPU and a memory unit including a ROM and a RAM. The CPU executes operation programs stored in the memory unit.

The controller 21 includes, as software, the extractor 121, the converter 122, the classifier 123, the counter 124, a pressurization stopper 125, a pressurizing unit 126, a valve adjuster 127, and the determination unit 128.

Figure 4:
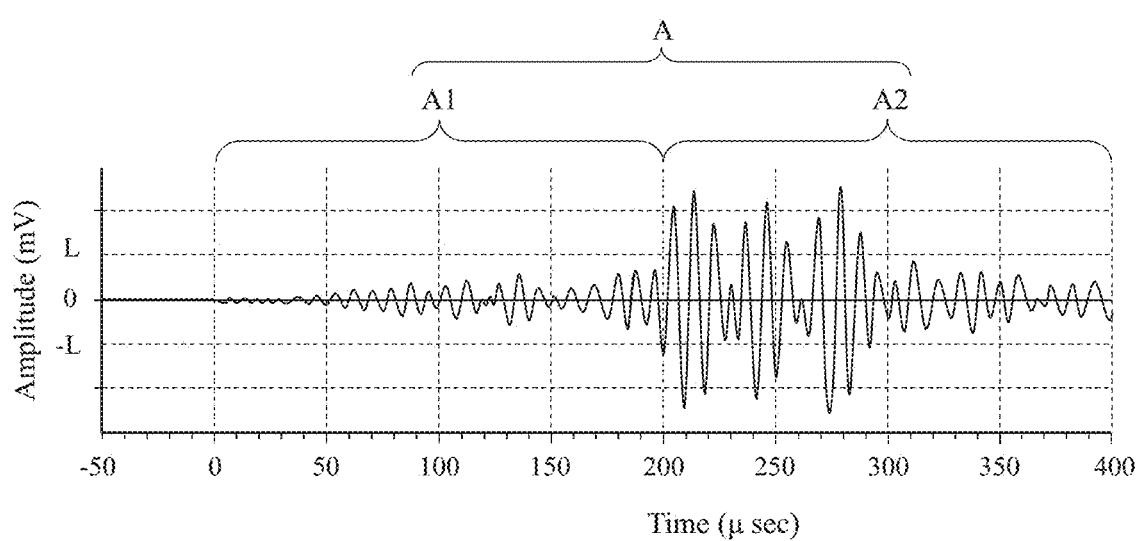
FIG. 4 shows an output waveform of an AE sensor when a high-pressure tank filled with liquid is pressurized.

The extractor 121 receives the output waveform of the AE sensors 3. The extractor 121 extracts a plurality of AE waveforms from the output waveform of the AE sensors 3. Specifically, the output waveform of the AE sensors 3 includes the combination of a large number of waveforms as shown in FIG. 4, for example. In the waveform shown in FIG. 4, region A represents the vibration generated when AE occurs in the high-pressure tank 50. Region A1 represents the vibration during propagation through the fiber-reinforced resin layer 52, and region A2 represents the vibration during propagation through water.

At a timing when the amplitude becomes equal to or greater than a predetermined threshold (L) after AE occurs in the high-pressure tank 50, the extractor 121 extracts a mass of vibrations (region A) within a certain period including the timing as one AE waveform. The threshold is set for noise removal. When a predetermined time elapses after the amplitude becomes equal to or greater than the predetermined threshold, the vibration becomes smaller and so the amplitude becomes less than the predetermined threshold. After extracting the AE waveform, the extractor 121 extracts the next AE waveform when the amplitude reaches equal to or greater than the predetermined threshold again after the elapse of a certain period of time. In this way, the extractor 121 sequentially extracts a plurality of AE waveforms from the output waveform of the AE sensors 3 and outputs them to the converter 122.

When these AE waveforms derived from the plurality of AEs are connected and are output as one large (long in the time axis) AE waveform, the accurate classification of the waveform will fail even with the classifier 123 that classifies the waveforms as described later. That is, if the amplitude becomes equal to or greater than the predetermined threshold and then does not fall below the predetermined threshold after a certain period of time, the classifier 123 does not classify that AE waveform. Note that such an AE waveform is less than a few percentage of all AE waveforms, and so it hardly affects the count number of AE waveforms, that is, the test result for the high-pressure tank 50.

Each AE waveform extracted by the extractor 121 is a first waveform derived from the occurrence of macrocracks that increase immediately before the destruction of the high-pressure tank 50 or a second waveform derived from the occurrence of microcracks smaller than the macrocracks. It is not easy to classify the AE waveform immediately after extraction into the first waveform or the second waveform. The present embodiment therefore frequency-analyzes the extracted AE waveform by the converter 122, and then classifies the AE waveform into the first waveform or the second waveform.

Macrocracks increase immediately before the destruction of the high-pressure tank, and the increase of the macrocracks eventually leads to the destruction of the high-pressure tank. Microcracks are shorter in length than macrocracks. A macrocrack is formed by connecting a plurality of microcracks. While microcracks occur from a state without cracks, macrocracks are formed by connecting a plurality of microcracks. In this way, the formation processes of them are different, and so the AE waves generated with occurrence of both cracks seem to have a difference. The length of a macrocrack is often 0.1 mm or more due to the connection of a plurality of microcracks. To acquire teaching data described later, less than 0.1 mm is defined as a microcrack, and 0.1 mm or more is defined as a macrocrack.

Figure 5:
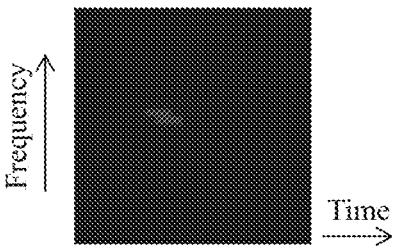
FIG. 5 shows teaching data that is used when a classifier of the pressure tester according to the first embodiment of the present disclosure is machine-learned.
Figure 5:
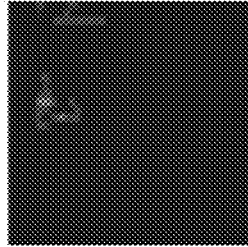
Figure 5:
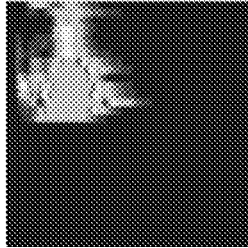
Figure 5:
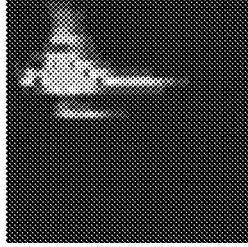

The converter 122 sequentially performs time-frequency analysis on the AE waveform input from the extractor 121. The converter 122 in the present embodiment wavelet-transforms the AE waveform to generate an image (scalogram) as shown in FIG. 5. The horizontal axis of the images (scalograms) shown in FIG. 5 indicates time, the vertical axis indicates frequency, and the color (density) indicates intensity. Wavelet transformation is a frequency analysis using a wavelet function as a basis function. The wavelet transformation calculates the frequency characteristics while leaving the temporal information, unlike the Fourier transform. The wavelet transformation is defined by the following equation (1).

$$WT(b, a) = \frac{1}{\sqrt{|a|}} \int_{-\infty}^{\infty} f(t) \overline{\psi\left(\frac{t-b}{a}\right)} dt \quad (1)$$

In equation (1), a is the scale parameter, b is the shift parameter, and $\Psi(t)$ is the mother wavelet. Since the wavelet transformation itself is a known technique, detailed description thereof will be omitted.

The classifier 123 uses a support vector machine as a machine learning algorithm. The classifier 123 is machine-learned in advance so as to classify the output (image) of the converter 122 into a first image corresponding to the first waveform derived from macrocracks that increase immediately before the destruction of the high-pressure tank 50, or a second image corresponding to the second waveform derived from microcracks. The classifier 123 outputs the classified first images and second images to the counter 124. The machine learning method of the classifier 123 will be described later.

The counter 124 counts the numbers of the first images and the second images, and outputs the resultant to the pressurization stopper 125. The counter 124 may also be able to count the number of AE waveforms extracted by the extractor 121, if necessary.

The pressurization stopper 125 determines whether or not to stop the pressurization of the high-pressure tank 50 based on the number of the first images (in other words, the number of generated macrocracks). The pressurization stopper 125 in the present embodiment determines whether or not the cumulative number of the first images is equal to or greater than a first threshold. The method for determining the first threshold will be described later.

When the cumulative number of the first images is equal to or greater than the first threshold, the pressurization stopper 125 outputs a stop signal to stop the pressurization of the high-pressure tank 50 to the pressurizing unit 126. At this time, the pressurization stopper 125 outputs a valve driving signal to close the valve 7 and open the valve 9 to the valve adjuster 127. The pressurization stopper 125 also outputs a stop output signal to the determination unit 128, the stop output signal indicating that the stop signal has been output to the pressurizing unit 126.

When the cumulative number of the first images is less than the first threshold, the pressurization stopper 125 does not output the stop signal, the valve driving signal, and the stop output signal. This keeps the pressurization of the high-pressure tank 50, that is, testing of the high-pressure tank 50.

The pressurization stopper 125 detects the internal pressure of the high-pressure tank 50 based on a pressure signal from the pressure sensor 4. When the internal pressure of the high-pressure tank 50 reaches the upper limit of the test pressure, the pressurization stopper 125 outputs the stop signal, the valve driving signal, and the stop output signal to the pressurizing unit 126, the valve adjuster 127, and the determination unit 128, respectively.

Receiving the stop signal from the pressurization stopper 125, the pressurizing unit 126 stops driving the pump 2.

Receiving the valve driving signal from the pressurization stopper 125, the valve adjuster 127 closes the valve 7 and opens the valve 9.

Receiving the stop output signal from the pressurization stopper 125, the determination unit 128 determines whether the internal pressure of the high-pressure tank 50 is the upper limit of the test pressure or not. When the internal pressure of the high-pressure tank 50 is lower than the upper limit of the test pressure, the determination unit 128 determines that the high-pressure tank 50 has abnormality, and rejects the high-pressure tank 50. When the internal pressure of the high-pressure tank 50 is equal to or higher than the upper limit of the test pressure, the determination unit 128 determines that the high-pressure tank 50 has no abnormality, and accepts the high-pressure tank 50.

Next the following describes a method for machine learning of the classifier 123.

In this embodiment, as shown in FIG. 5, the classifier 123 is machine-learned using teaching data, in which images (scalograms) and types of cracks (macrocracks, microcracks) are associated. The moment when a crack occurs cannot be visually captured. It is therefore necessary to confirm that the first images correspond to macrocracks and the second images correspond to the microcracks.

Figure 6:
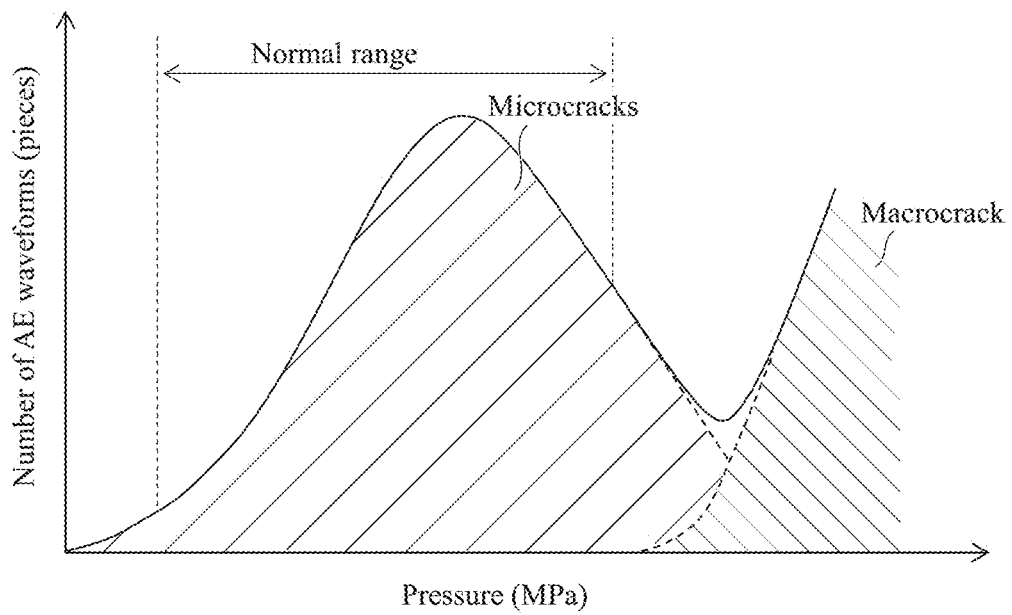
FIG. 6 conceptually shows the state of occurrence of microcracks and macrocracks when a high-pressure tank is pressurized.

Then, a method of acquiring teaching data to be used for machine learning is described first. FIG. 6 conceptually shows the state of occurrence of microcracks and macrocracks when a high-pressure tank is pressurized. FIG. 6 shows the number of cracks generated every time when the internal pressure of the high-pressure tank increases by a predetermined pressure. As shown in FIG. 6, when the pressure inside the high-pressure tank 50 increases, microcracks and macrocracks occur in the fiber-reinforced resin layer 52. In the relatively low range of the internal pressure of the high-pressure tank 50 (for example, several tens of MPa), microcracks occur, while macrocracks rarely occur. As the internal pressure of the high-pressure tank 50 increases, the number of macrocracks increases, and then the high-pressure tank 50 breaks.

The internal pressure of a high-pressure tank 50 for learning was increased to a first pressure (for example, several tens of MPa), and the plurality of AE waveforms obtained was wavelet-transformed to create images. The created plurality of (for example, several tens or more) images was classified into two. Here, they were classified into images having a large difference in intensity (color density)(hereinafter referred to as first images) and images having a small difference in intensity (color density) (hereinafter referred to as second images). The actual classification in this way showed that the number of the second images was larger than the number of the first images, and the proportion of the second images was 95% or more.

After increasing the internal pressure of the high-pressure tank 50 to the first pressure, the pressurization of the high-pressure tank 50 was stopped, and the cross section of the fiber-reinforced resin layer 52 of the high-pressure tank 50 was observed. Actual observation of the cross section showed that microcracks and macrocracks were formed in the fiber-reinforced resin layer 52. The number of microcracks was 95% or more of the total number of cracks (total of microcracks and macrocracks). This suggests that the first images correspond to macrocracks and the second images correspond to microcracks.

The internal pressure of another high-pressure tank 50 for learning was increased to a second pressure (for example, a hundred and several tens of MPa), and images were created in the same manner as above. Then the plurality of created images (for example, several tens or more) was classified into two. The actual classification in this way showed that the proportion of the number of the first images increased compared to the case of increasing the internal pressure of the high-pressure tank 50 to the first pressure. The number of the AE waveforms extracted from the output waveforms of the AE sensors 3 (i.e., the number of AEs generated in the high-pressure tank 50) also increased compared to the case of increasing the internal pressure of the high-pressure tank 50 to the first pressure.

The cross section of the fiber-reinforced resin layer 52 was observed in the same manner as when the pressure was increased to the first pressure. The actual observation of the cross section showed that the number of macrocracks increased compared to the case of increasing the internal pressure to the first pressure.

The internal pressure of another high-pressure tank 50 for learning was increased until the high-pressure tank 50 broke. Images were created from the output waveforms from the AE sensors 3 immediately before the destruction in the same manner as described above, and the created plurality of images (for example, several tens or more) was classified into two. The actual classification in this way showed that the proportion of the number of the first images further increased compared to the case of increasing the internal pressure of the high-pressure tank 50 to the second pressure. The number of the AE waveforms extracted from the output waveforms of the AE sensors 3 (i.e., the number of AEs generated in the high-pressure tank 50) also increased compared to the case of increasing the internal pressure of the high-pressure tank 50 to the second pressure.

The cross section of the fiber-reinforced resin layer 52 was observed in the same manner as when the pressure was increased to the second pressure. The actual observation of the cross section showed that the number of macrocracks further increased compared to the case of increasing the internal pressure to the second pressure.

From the above, the first images correspond to macrocracks and the second images correspond to microcracks. The data as shown in FIG. 5 with the images classified into the first images (macrocracks) and the second images (microcracks) was prepared as the teaching data.

Next, the classifier 123 was machine-learned using this teaching data. Specifically, the classifier 123 was machine-learned using 250 out of 300 teaching data as training data so as to classify images into first images derived from macrocracks and second images derived from microcracks. Next the classifier 123 tried to classify images into first images and second images using the remaining 50 of the 300 teaching data as evaluation data. The result showed that the correct answer rate by the classifier 123 was 70% or more, and the classification accuracy was sufficiently high. In this way, the classifier 123 was machine-learned.

Next, a method for determining the first threshold is described below.

Figure 7:
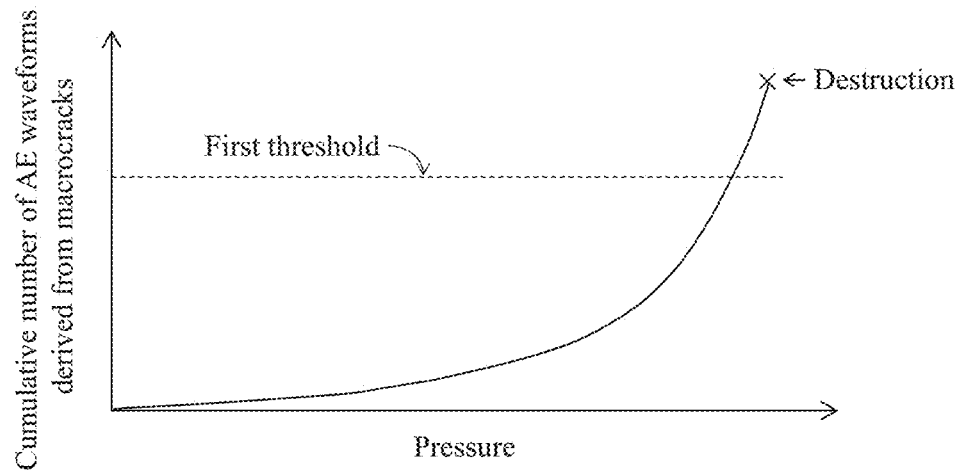
FIG. 7 shows the cumulative number of AE waveforms derived from macrocracks when a high-pressure tank is pressurized.

When the internal pressure of the high-pressure tank 50 is increased until the high-pressure tank 50 breaks, the number of AEs (the number of AE waveforms) in the high-pressure tank 50 also increases. In particular, the number of AE waveforms derived from macrocracks increases from the timing when the internal pressure of the high-pressure tank 50 exceeds the normal range, and as shown in FIG. 7, immediately before the destruction of the high-pressure tank 50, this number increases sharply.

Then, the cumulative number of AE waveforms derived from macrocracks (in this case, the cumulative number of the first images) at the time of destruction of the high-pressure tank 50 is measured. This procedure is conducted to a plurality of high-pressure tanks 50, which leads to the finding of the relationship between the cumulative number of AE waveforms derived from macrocracks and the destruction of the high-pressure tanks 50. This therefore enables setting of the first threshold (threshold for preventing the destruction of the high-pressure tank 50) while considering variations.

When measuring the cumulative number of AE waveforms derived from macrocracks, all AE waveforms extracted by the extractor 121 may be converted into images by the converter 122, and the images may be classified into the first images and the second images by the classifier 123. However, tens of thousands of AE waveforms are extracted every time when the internal pressure of the high-pressure tank 50 increases by 5 MPa. It is therefore not easy to convert and classify all of the AE waveforms. Then 100 AE waveforms, for example, may be selected from the AE waveforms extracted by the extraction unit 121, and these 100 AE waveforms may be converted and classified to calculate the proportions of the first images and the second images. The cumulative number of AE waveforms derived from macrocracks may be calculated from the proportion of the first images and the total number of AE waveforms extracted by the extractor 121.

Next, a pressure testing method for a high-pressure tank 50 using the pressure tester 20 is described below. This pressure testing method is conducted after the manufacturing of the high-pressure tank 50 (before shipment), and the pressure inside the high-pressure tank 50 is increased to 1.5 times or more the upper limit of the normal range.

Figure 8:
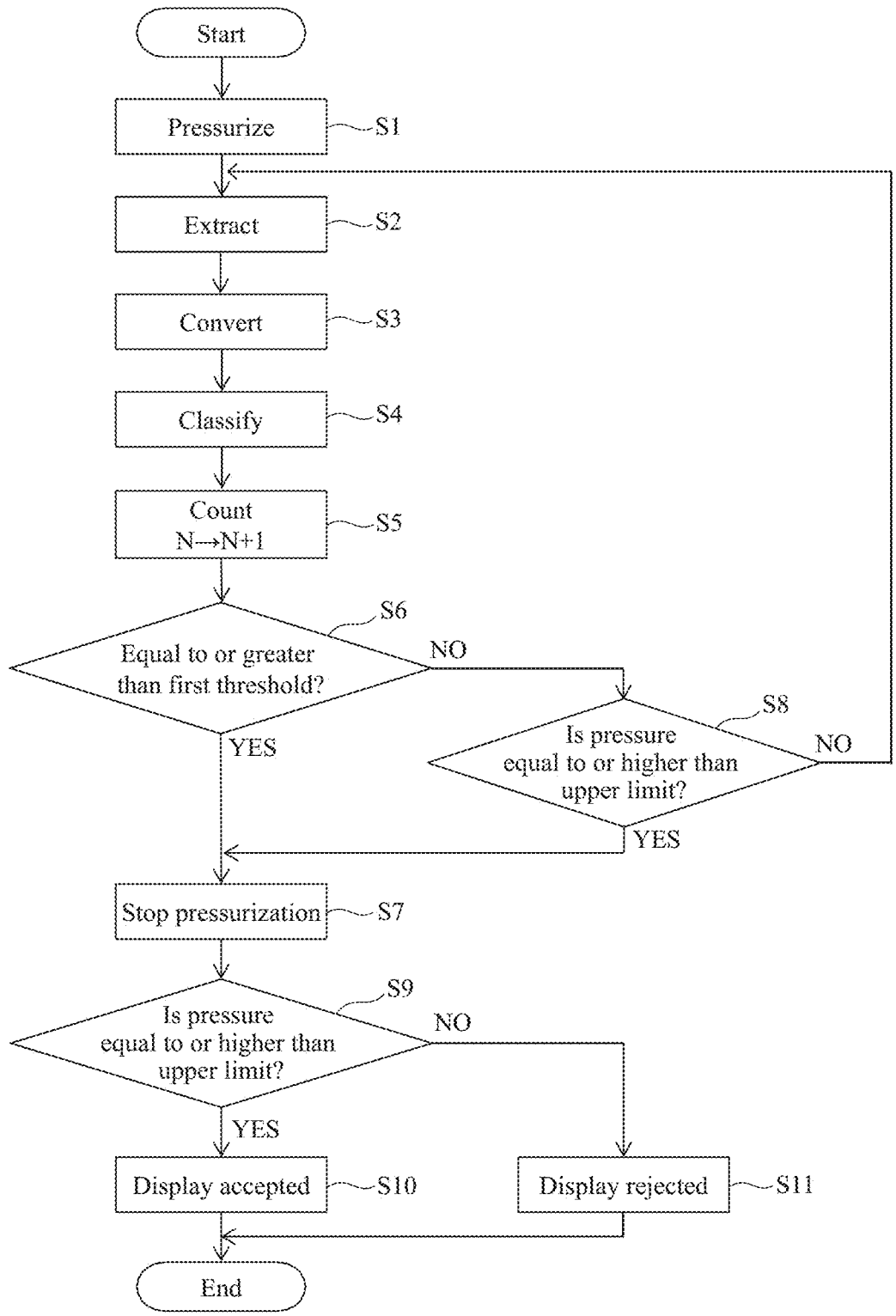
FIG. 8 is a flowchart showing a pressure testing method according to the first embodiment of the present disclosure.

As shown in FIG. 8, at step S1, the operator operates the operation unit 23 of the pressure tester 20 to cause the pressure tester 20 to increase the pressure inside the high-pressure tank 50. At this step, the valve 7 is open and the valve 9 is closed. The internal pressure of the high-pressure tank 50 is increased at a substantially constant rate.

At step S2, microcracks and macrocracks occur in the fiber-reinforced resin layer 52 as the internal pressure of the high-pressure tank 50 increases. Then the AE sensors 3 output waveforms including AE waveforms to the extractor 121. The extractor 121 sequentially extracts the AE waveforms from the output waveforms of the AE sensors 3 and outputs them to the converter 122.

At step S3, the converter 122 wavelet-transforms the AE waveforms input from the extractor 121 to sequentially create images (scalograms). The converter 122 outputs the created images to the classifier 123.

At step S4, the classifier 123 classifies the output (images) of the converter 122 into first images corresponding to the first waveforms and second images corresponding to the second waveforms. The classifier 123 outputs the classified first images and second images to the counter 124.

At step S5, the counter 124 counts (adds 1 to N) the numbers of the first images and the second images that are sequentially input from the classifier 123. The counter 124 outputs the counted numbers of the first images and the second images to the pressurization stopper 125.

At step S6, the pressurization stopper 125 determines whether or not the cumulative number of the first images is equal to or greater than a first threshold.

When the cumulative number of the first images is equal to or greater than the first threshold, i.e., when the high-pressure tank 50 is in the state immediately before the destruction, the pressurization stopper 125 outputs a stop signal to stop the pressurization of the high-pressure tank 50 to the pressurizing unit 126. At this time, the pressurization stopper 125 outputs a valve driving signal to the valve adjuster 127 and outputs a stop output signal to the determination unit 128. Then, the procedure proceeds to step S7.

When the cumulative number of the first images is less than the first threshold value, that is, when the high-pressure tank 50 is not in the state immediately before the destruction, the procedure proceeds to step S8.

At step S8, the pressurization stopper 125 determines whether or not the internal pressure of the high-pressure tank 50 is equal to or higher than the upper limit value of the test pressure based on the output of the pressure sensor 4. When the internal pressure of the high-pressure tank 50 is equal to or higher than the upper limit of the test pressure, the pressurization stopper 125 outputs a stop signal, a valve driving signal, and a stop output signal to the pressurizing unit 126, the valve adjuster 127, and the determination unit 128, respectively, and the procedure proceeds to step S7. When the internal pressure of the high-pressure tank 50 is lower than the upper limit of the test pressure, the procedure returns to step S2.

At step S7, the pressurizing unit 126 stops the pump 2. This stops the pressurization of the high-pressure tank 50. The valve adjuster 127 closes the valve 7 and opens the valve 9. This stops the feeding of water to the high-pressure tank 50, and exhausts water in the high-pressure tank 50 to the outside through the exhaust pipe 8. As a result, the internal pressure of the high-pressure tank 50 decreases, and so the procedure prevents the destruction of the high-pressure tank 50.

At step S9, the determination unit 128 determines whether or not the internal pressure of the high-pressure tank 50 is equal to or higher than the upper limit value of the test pressure. When the internal pressure of the high-pressure tank 50 is equal to or higher than the upper limit of the test pressure, the determination unit 128 determines that the strength of the high-pressure tank 50 is sufficient, and the procedure proceeds to step S10. At step S10, the display unit 22 displays that the high-pressure tank 50 has passed the test.

On the other hand, at step S9, if the internal pressure of the high-pressure tank 50 is lower than the upper limit of the test pressure, the determination unit 128 determines that the strength of the high-pressure tank 50 is not sufficient, and the procedure proceeds to step S11. At step S11, the display unit 22 displays that the high-pressure tank 50 has failed the test.

Then, the pressure test for the high-pressure tank 50 ends.

As described above, the present embodiment extracts a plurality of AE waveforms from the output waveforms of the AE sensors 3 while increasing the pressure inside the high-pressure tank 50, classifies the extracted plurality of AE waveforms into first images corresponding to the first waveforms and second images corresponding to the second waveforms, and stops the pressurization of the high-pressure tank 50 based on the number of the classified first images. This enables a determination whether or not the high-pressure tank 50 is in the state immediately before the destruction based on the number of the first images and stopping the pressurization of the high-pressure tank 50 based on the determination. The present embodiment therefore stops the pressurization of the high-pressure tank 50 before destruction of the high-pressure tank 50, and so prevents the destruction of the high-pressure tank 50.

As described above, when the cumulative number of the first images exceeds the first threshold, the present embodiment stops the pressurization of the high-pressure tank 50. As the high-pressure tank 50 is pressurized, the number of macrocracks increases immediately before the destruction, and the cumulative number of the first waveforms derived from the macrocracks accordingly increases. When the cumulative number of the first waveforms exceeds a certain value (first threshold), the high-pressure tank 50 is more likely to break. The present embodiment enables a determination whether or not the high-pressure tank 50 is in the state immediately before the destruction based on the cumulative number of the first images corresponding to the first waveforms, and so prevents the destruction of the high-pressure tank 50 reliably.

As described above, the present embodiment wavelet-transforms the extracted AE waveforms to create images (scalograms) indicative of a temporal change of the frequency components. The classifier 123 classifies the created plurality of images into first images and second images easily, and so the present embodiment enables easy determination whether or not the high-pressure tank 50 is in the state immediately before the destruction.

Second Embodiment

The second embodiment describes the case where, unlike the first embodiment, the high-pressure tank 50 is filled with gas for pressurizing the inside of the high-pressure tank 50.

The pump 2 feeds gas (in this example, nitrogen) to the inside of the high-pressure tank 50 to pressurize the inside of the high-pressure tank 50. Nitrogen is fed into the high-pressure tank 50 through the feed pipe 6 and is exhausted to the outside of the high-pressure tank 50 through the exhaust pipe 8. Nitrogen may be exhausted into the testing room through the exhaust pipe 8. The gas fed in the high-pressure tank 50 is not limited to nitrogen, and examples of the gas include helium, air, and a mixed gas of helium and nitrogen.

Figure 9:
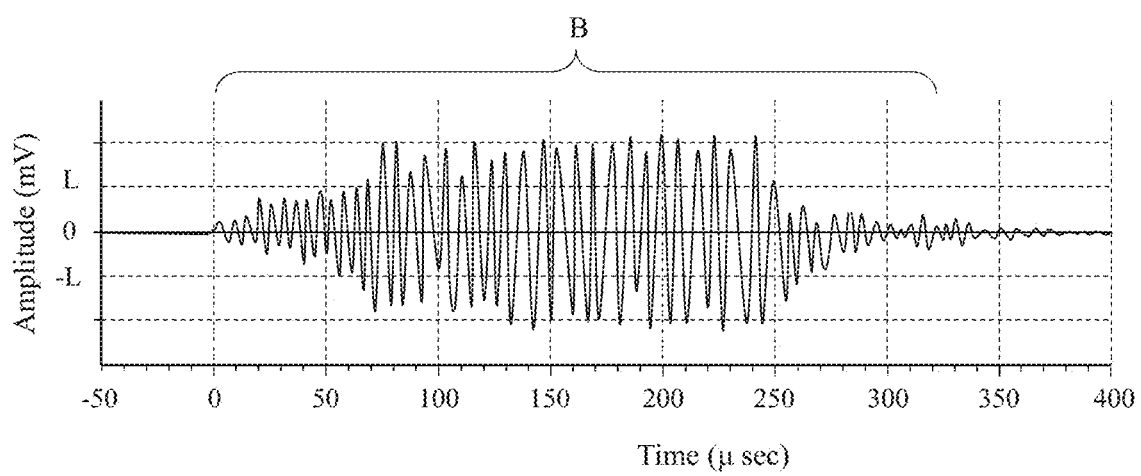
FIG. 9 shows an output waveform of an AE sensor when a high-pressure tank filled with gas is pressurized.

In the present embodiment, the high-pressure tank 50 is filled with gas (nitrogen in this example). The AE waves (vibration) generated in response to AE generated in the high-pressure tank 50 therefore propagate through the fiber-reinforced resin layer 52 to be detected by the AE sensors 3. The output waveform of the AE sensors 3 therefore includes the combination of a large number of waveforms as shown in FIG. 9. Region B in FIG. 9 corresponds to Region A1 (vibration propagating through the fiber-reinforced resin layer 52) in FIG. 4, and the AE waveform is amplified.

Figure 10:
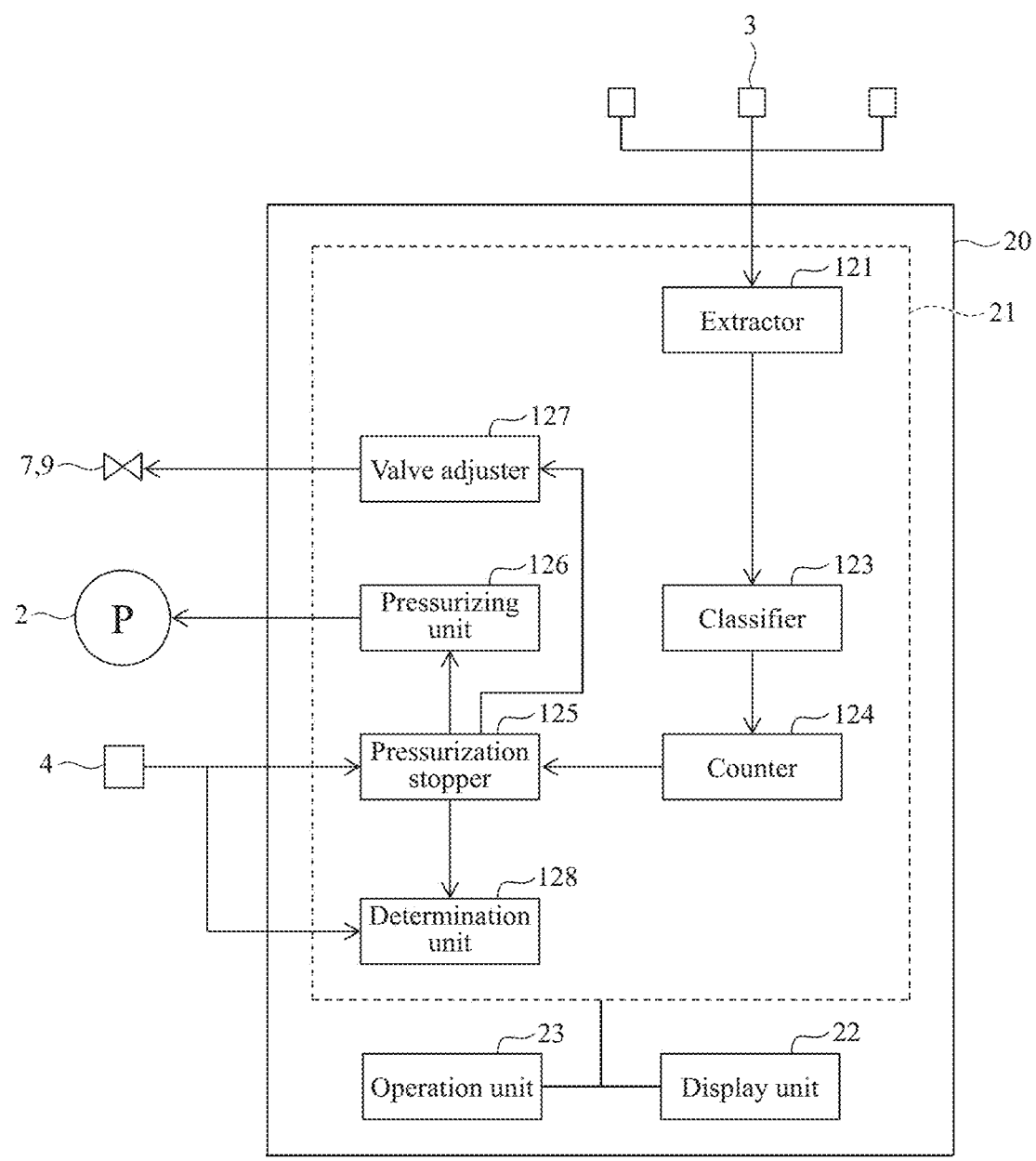
FIG. 10 is a block diagram showing the configuration of a controller of the pressure tester according to a second embodiment of the present disclosure.

As shown in FIG. 10, the controller 21 of the pressure tester 20 of the present embodiment includes an extractor 121, a classifier 123, a counter 124, a pressurization stopper 125, a pressurizing unit 126, a valve adjuster 127, and a determination unit 128, and does not include a converter 122.

The extractor 121 receives the output waveforms of the AE sensors 3 as input. When AE occurs in the high-pressure tank 50 and the amplitude exceeds a predetermined threshold (L), the extractor 121 extracts a mass of vibrations (region B) as one AE waveform. This AE waveform does not include vibrations propagating through water. In other words, waves are not reflected at the interface between water and the liner 51, and the waves (vibration) propagating through the fiber-reinforced resin layer 52 do not overlap with the waves (vibration) propagating through water. Therefore, unlike the first embodiment as described above, this embodiment enables accurate classification of the AE waveforms (output waveforms of the AE sensors 3) into the first waveforms and the second waveforms without the converter 122.

The classifier 123 sequentially receives the output waveforms from the extractor 121. The classifier 123 is machine-learned in advance so as to classify the output (AE waveforms) of the extractor 121 into first waveforms derived from macrocracks that increase immediately before the destruction of the high-pressure tank 50, and second waveforms derived from microcracks. The classifier 123 outputs the classified first waveforms and second waveforms to the counter 124.

The counter 124 counts the numbers of the first waveforms and the second waveforms, and outputs the resultant to the pressurization stopper 125.

The pressurization stopper 125 determines whether or not to stop the pressurization of the high-pressure tank 50 based on the number of the first waveforms. The pressurization stopper 125 in the present embodiment determines whether or not the cumulative number of the first waveforms is equal to or greater than a first threshold.

The second embodiment is similar to the first embodiment as described above in the other configuration and the method of determining the first threshold. Examples of the feature amounts used for the teaching data when the classifier 123 is machine-learned include the maximum amplitude (maximum intensity) of the AE waveform, the rise time, the frequency of the signals exceeding the threshold value, the waveform duration, and the energy. In one example, the AE waveforms may be classified into two depending on whether or not it is equal to or greater than a certain threshold for a feature amount (maximum amplitude, etc.). The pressure tester 20 may be configured to select the feature amount(s) used for classification.

Figure 11:
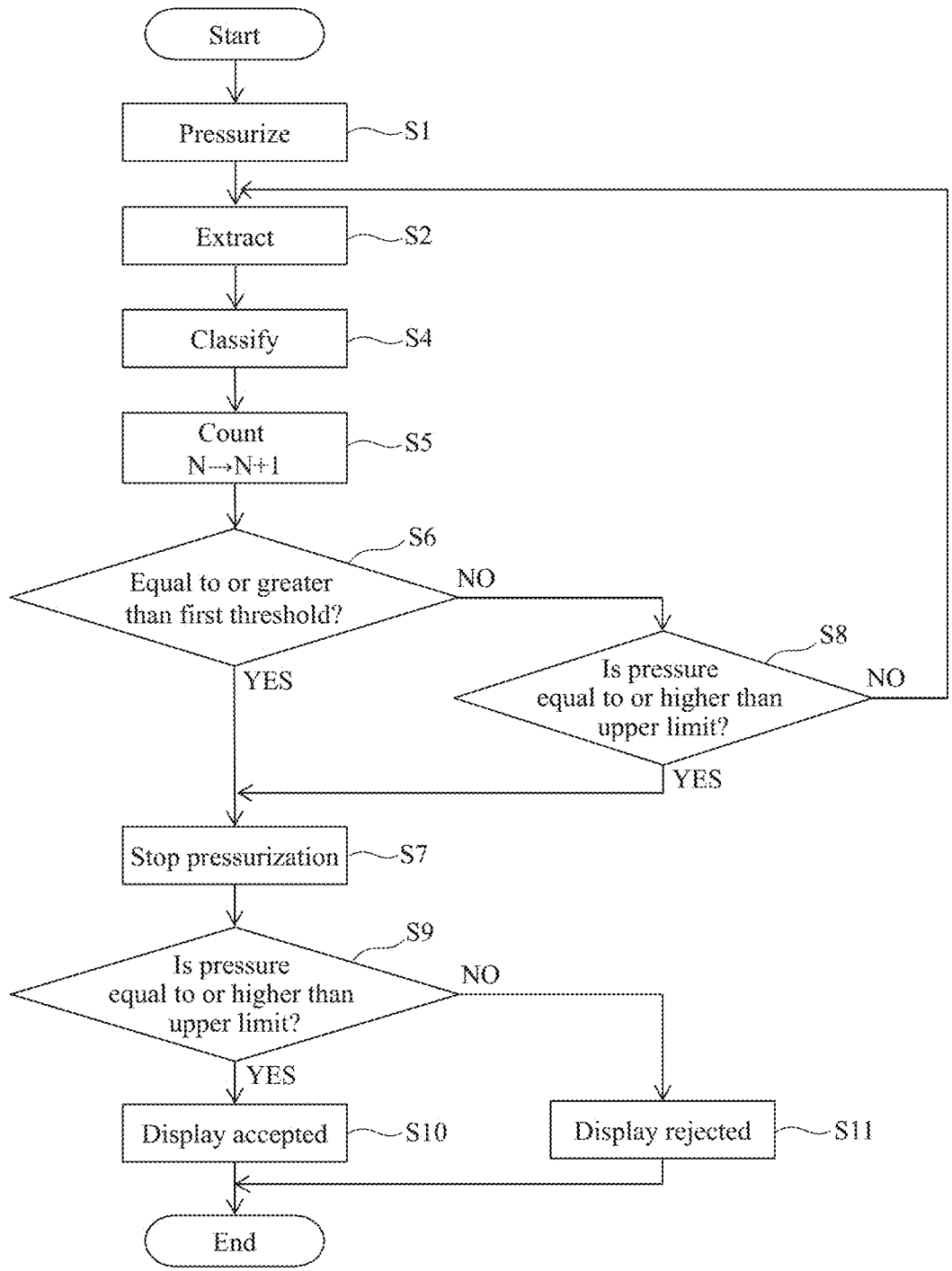
FIG. 11 is a flowchart showing a pressure testing method according to the second embodiment of the present disclosure.

Referring next to FIG. 11, the following describes a pressure testing method for a high-pressure tank 50 using this pressure tester 20.

Steps S1 and S2 in this embodiment are similar to those in the first embodiment as described above. Note here that at step S2, the extractor 121 outputs AE waveforms, which are extracted from the output waveforms of the AE sensors 3, to the classifier 123. This embodiment does not have step S3.

At step S4, the classifier 123 classifies the output (AE waveforms) of the extractor 121 into first waveforms and second waveforms. The classifier 123 outputs the classified first waveforms and second waveforms to the counter 124.

At step S5, the counter 124 counts the numbers of the first waveforms and the second waveforms, and outputs the resultant to the pressurization stopper 125.

At step S6, the pressurization stopper 125 determines whether or not the cumulative number of the first waveforms is equal to or greater than a first threshold.

When the cumulative number of the first waveforms is equal to or greater than the first threshold, the pressurization stopper 125 outputs a stop signal to stop the pressurization of the high-pressure tank 50 to the pressurizing unit 126. Then, the procedure proceeds to step S7. When the cumulative number of the first waveforms is less than the first threshold value, the procedure proceeds to step S8.

The pressure testing method in other points and other effects of the present embodiment are the same as those of the first embodiment.

The embodiments disclosed here are to be considered in all respects as illustrative and not restrictive. The scope of the present disclosure is defined by the claims and not by the embodiments, and is intended to include any modification within the meaning and scope equivalent to the terms of the claims.

Figure 12:
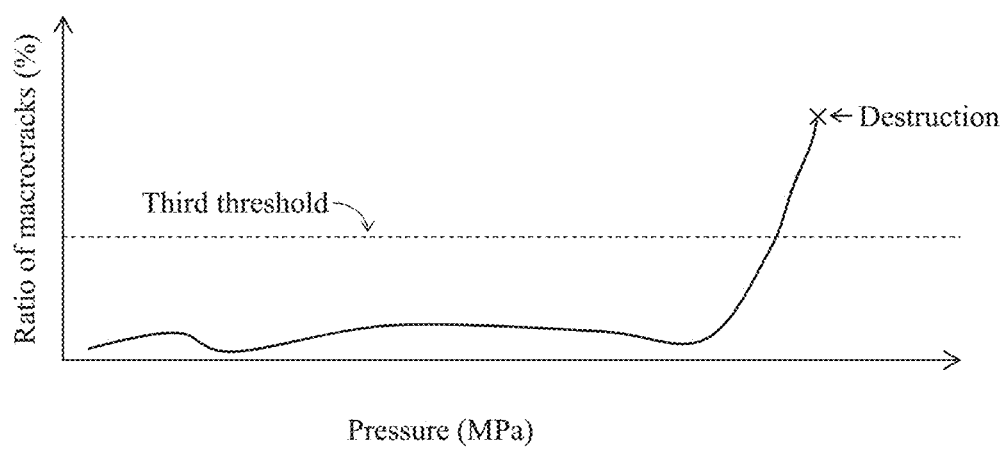
FIG. 12 shows the ratio of the number of macrocracks to the number of microcracks and macrocracks generated when the high-pressure tank is pressurized.

For example, the above embodiments describe an example in which the pressurization of the high-pressure tank stops when the cumulative number of the first images (or the first waveforms) exceeds the first threshold, and the present disclosure is not limited to this. In one example, the increasing rate of the first waveforms to the increase amount of pressure in a high-pressure tank (that is, the slope of the graph in FIG. 7) increases sharply immediately before the destruction of the high-pressure tank. When the increasing rate of the first waveforms to the increase amount of pressure in the high-pressure tank is equal to or greater than a second threshold, the pressurization of the high-pressure tank may be stopped. As shown in FIG. 12, the ratio of the number of macrocracks generated to the number of microcracks and macrocracks generated increases sharply immediately before the destruction of a high-pressure tank. When the ratio of the first waveforms to the sum of the first waveforms and the second waveforms is equal to or greater than a third threshold, the pressurization of the high-pressure tank may be stopped. In either case, the method enables a determination about whether or not the high-pressure tank is in the state immediately before the destruction, and so prevents the destruction of the high-pressure tank reliably. Two or more of the cumulative number of the first waveforms, the increasing rate of the first waveforms to the increase amount of pressure, and the ratio of the first waveforms may be used in combination, and when any one of them exceeds the threshold value, pressurization of the high-pressure tank may be stopped.

The above embodiments describe the pressure testing method of a high-pressure tank after manufacturing (before shipment), and the present disclosure is not limited to this. The pressure testing method of the present disclosure is applicable to a pressure test for a high-pressure tank after mounting it on a vehicle (to vehicle inspection).

The first embodiment describes the example of wavelet-transforming AE waveforms, and the present disclosure is not limited to this. AE waveforms may be converted by other methods, including fast Fourier transform, short-time Fourier transform, and Wigner distribution.

The second embodiment describes the example of not converting AE waveforms, and the present disclosure is not limited to this. Even when the high-pressure tank 50 is pressurized by filling it with gas, the AE waveforms may be converted by wavelet transformation, for example, and then may be classified. This configuration classifies the images into the first images (or first waveforms) and the second images (or second waveforms) more accurately.

The above embodiments describe the example of using a support vector machine as a machine learning algorithm of the classifier, and the present disclosure is not limited to this. In one example, another machine-learning algorithm, including k-means method, VAE (Variational Auto Encoder). CNN (Convolutional Neural Network), GAN (Generative Adversarial Network), Bayesian filter, or isolation forest, may be used for classification.

To set the first threshold (threshold to prevent the destruction of a high-pressure tank), the first threshold may be set using any one of the machine-learning algorithms as described above.

What is claimed is:

1. A pressure testing method for a high-pressure tank including a liner having an outer surface and a fiber-reinforced resin layer covering the outer surface of the liner, the method comprising: extracting a plurality of AE waveforms from an output waveform of an AE sensor, the AE sensor being configured to detect AE waves generated in the high-pressure tank while increasing a pressure inside the high-pressure tank; and testing the high-pressure tank based on the extracted plurality of AE waveforms, the method further comprising:
while increasing the pressure inside the high-pressure tank,
classifying the extracted plurality of AE waveforms into first waveforms and second waveforms with a classifier that is machine-learned so as to classify the plurality of AE waveforms into the first waveforms derived from a macrocrack that increases immediately before destruction of the high-pressure tank, and the second waveforms derived from a microcrack smaller than the macrocrack;
counting the number of the first waveforms classified, and stopping pressurization of the high-pressure tank based on the number of the first waveforms counted.

2. The pressure testing method according to claim 1, wherein in response to the cumulative number of the first waveforms reaching equal to or greater than a first threshold, the method stops pressurization of the high-pressure tank.

3. The pressure testing method according to claim 1, wherein in response to an increasing rate of the first waveforms to an increase amount of pressure in the high-pressure tank being equal to or greater than a second threshold, the method stops pressurization of the high-pressure tank.

4. The pressure testing method according to claim 1, wherein in response to a ratio of the first waveforms to a sum of the first waveforms and the second waveforms increasing equal to or greater than a third threshold, the method stops pressurization of the high-pressure tank.

5. The pressure testing method according to claim 1, wherein the high-pressure tank is filled with liquid for pressurizing the inside of the high-pressure tank.

6. The pressure testing method according to claim 1, wherein the high-pressure tank is filled with gas for pressurizing the inside of the high-pressure tank.

7. The pressure testing method according to claim 1, wherein
the method wavelet-transforms the extracted plurality of AE waveforms to create a plurality of images while increasing the pressure inside the high-pressure tank,
classifies the plurality of images corresponding to the plurality of AE waves into first images corresponding to the first waveforms and second images corresponding to second waveforms with the classifier that is machine-learned so as to classify the first images and the second images;
counts the number of the first images classified; and
stops pressurization of the high-pressure tank based on the number of the first images counted.

8. A pressure tester configured to test a high-pressure tank including a liner having an outer surface and a fiber-reinforced resin layer covering the outer surface of the liner, the pressure tester being configured to extract a plurality of AE waveforms from an output waveform of an AE sensor, the AE sensor being configured to detect AE waves generated in the high-pressure tank while increasing a pressure inside the high-pressure tank; and test the high-pressure tank based on the extracted plurality of AE waveforms,
the pressure tester comprising a controller configured to control pressurization of an inside of the high-pressure tank,
the controller comprising:
a pressurizing unit configured to execute pressurization of the inside of the high-pressure tank;
a classifier that is machine-learned so as to classify the plurality of AE waveforms into first waveforms derived from macrocracks that increase immediately before destruction of the high-pressure tank, and second waveforms derived from microcracks smaller than the macrocracks;

a counter configured to, while increasing the pressure inside the high-pressure tank by the pressurizing unit, count the number of the first waveforms classified by the classifier; and a pressurization stopper configured to stop pressurization of the high-pressure tank by the pressurizing unit based on the number of the first waveforms counted by the counter.

9. The pressure tester according to claim 8, wherein in response to the cumulative number of the first waveforms reaching equal to or greater than a first threshold, the pressurization stopper stops pressurization of the high-pressure tank.

10. The pressure tester according to claim 8, wherein in response to an increasing rate of the first waveforms to an increase amount of pressure in the high-pressure tank being equal to or greater than a second threshold, the pressurization stopper stops pressurization of the high-pressure tank.

11. The pressure tester according to claim 8, wherein in response to a ratio of the first waveforms to a sum of the first waveforms and the second waveforms increasing equal to or greater than a third threshold, the pressurization stopper stops pressurization of the high-pressure tank.

12. The pressure tester according to claim 8, wherein the pressurizing unit pressurizes the inside of the high-pressure tank with a pump configured to fill the high-pressure tank with liquid.

13. The pressure tester according to claim 8, wherein the pressurizing unit pressurizes the inside of the high-pressure tank with a pump configured to fill the high-pressure tank with gas.

14. The pressure tester according to claim 8, wherein the controller further includes: an extractor configured to extract a plurality of AE waveforms from an output waveform of the AE sensor; and a converter configured to wavelet-transform the plurality of AE waveforms extracted by the extractor to generate a plurality of images, the classifier is machine-learned so as to classify the plurality of images corresponding to the plurality of AE waves into first images corresponding to the first waveforms and second images corresponding to second waveforms, the extractor is configured to extract a plurality of AE waveforms from the output waveforms of the AE sensor while increasing the pressure inside the high-pressure tank, the converter is configured to wavelet-transform the plurality of AE waveforms extracted by the extractor to create a plurality of images, the classifier is configured to classify the plurality of images converted by the converter into the first images and the second images, the counter is configured to count the number of the first images classified by classifier, and the pressurization stopper is configured to stop pressurization of the high-pressure tank based on the number of the first images counted by the counter.

* * * * *